(12) United States Patent
Donaldson et al.

(10) Patent No.: US 7,037,430 B2
(45) Date of Patent: May 2, 2006

(54) SYSTEM AND METHOD FOR DESALINATION OF BRACKISH WATER FROM AN UNDERGROUND WATER SUPPLY

(75) Inventors: Burl Donaldson, Albuquerque, NM (US); Joseph Genin, Las Cruces, NM (US); Matthew S. Lavery, Edgewood, NM (US)

(73) Assignee: Efficient Production Technologies, Inc., Albuquerque, NM (US)

( * ) Notice: Subject to any disclaimer, the term of this patent is extended or adjusted under 35 U.S.C. 154(b) by 157 days.

(21) Appl. No.: 10/410,514

(22) Filed: Apr. 9, 2003

(65) Prior Publication Data
US 2003/0230534 A1 Dec. 18, 2003

Related U.S. Application Data

(60) Provisional application No. 60/371,904, filed on Apr. 10, 2002.

(51) Int. Cl.
*B01D 61/00* (2006.01)

(52) U.S. Cl. .................... 210/652; 210/175; 210/85; 210/89; 60/262; 60/266; 60/272; 60/320; 60/327

(58) Field of Classification Search ............... 210/650, 210/651, 652, 175, 85, 89; 204/186; 60/262, 60/266, 272, 320, 327, 721
See application file for complete search history.

(56) References Cited

U.S. PATENT DOCUMENTS

| | | | | | |
|---|---|---|---|---|---|
| 4,058,976 | A | * | 11/1977 | Kindl | 60/39.464 |
| 4,141,825 | A | * | 2/1979 | Conger | 210/638 |
| 4,391,102 | A | * | 7/1983 | Studhalter et al. | 60/649 |
| 4,434,057 | A | * | 2/1984 | Marquardt | 210/638 |
| 5,076,934 | A | | 12/1991 | Fenton | |
| 5,329,758 | A | * | 7/1994 | Urbach et al. | 60/775 |
| 5,346,592 | A | * | 9/1994 | Madani | 202/176 |
| 5,622,605 | A | | 4/1997 | Simpson et al. | |
| 6,126,834 | A | * | 10/2000 | Tonelli et al. | 210/652 |
| 6,537,456 | B1 | | 3/2003 | Mukhopadhyay | |

OTHER PUBLICATIONS

F.T. Tao et al., "Reverse osmosis process successfully converts oil field brine into freshwater", *Oil & Gas Journal*, Sep. 20, 1993.

M.A. Darwish et al., "Comparative Study Between Vapor Compression And Multi Effect Boiling Desalination Systems", *Desalination*, 1983, pp. 77-80.

(Continued)

*Primary Examiner*—Ana M. Fortuna
(74) *Attorney, Agent, or Firm*—Brinks Hofer Gilson & Lione

(57) ABSTRACT

A system and method of desalinating brackish water from an inland, underground water supply is disclosed. The system includes a source of underground water, at least one distillation and/or non-distillation desalination stage, and a source of waste heat from a power generator. The method includes desalinating brackish water drawn from an underground source using waste heat from a power generator and one or more non-distillation and/or distillation desalination stages. Potable water is recovered from both the brackish underground water using waste heat from the power generator, while dissolved salts are taken to dryness and removed as solids and from the flue gases.

4 Claims, 5 Drawing Sheets

OTHER PUBLICATIONS

N. Wade et al., "Desalination; the State of the Art", J. Ciwem, Apr. 11, 1997.

B. A/K. Abu-Hijleh et al., "Feasibility Study Of A Combined Electric Power And Water Desalination Plant In Jordon", *Energy Convers. Mgmt.*, vol. 39, No. 11, 1998, pp. 1207-1213.

N. M. Al-Najem et al., "Thermovapor compression desalters: energy and availability—Analysis of single- and multi-effect systems", Desalination 110, 1997, pp. 223-238.

M. Al-Shammiri et al., "Multi-effect distillation plants: state of the art", Desalination 126, 1999 pp. 45-59.

J. de Gunzbourg et al., "Cogenration applied to very high efficiency thermal seawater desalination plants", Desalination 125, 1999, pp. 203-208.

Kemmer, Frank N., "The NALCO Water Handbook", McGraw-Hill Book Company, Copyright 1979, pp. 10-1 to 10-13.

Hammond, R. Phillip, "Ultra-Efficient Desalination In A Dual Purpose Plant", AIAA-94-4070-CP, American Institute of Aeronautics and Astronautics, Inc., Copyright 1994, pp. 980-984.

* cited by examiner

SYSTEM AND METHOD FOR DESALINATION OF BRACKISH WATER FROM AN UNDERGROUND WATER SUPPLY

CROSS-REFERENCE TO RELATED APPLICATION

This application claims the benefit of U.S. Provisional Application No. 60/371,904, filed Apr. 10, 2002, and entitled "System And Method For Desalination Of Brackish Water From An Underground Water Supply", the entirety of which is incorporated herein by reference.

FIELD OF THE INVENTION

This application relates to desalination of water. More specifically, this application relates to the desalination of brackish water drawn from underground sources using excess heat generated by a power plant to generate a supply of potable water.

BACKGROUND

The desalination of seawater is practiced in some coastal, arid regions of the world in association with electric power production. Waste heat from the power production process is available and used to drive the desalination process in these plants. In traditional practice, the waste heat is utilized for evaporation of saline water by Multi-Stage Flash (MSF) or Multi-Effect Distillation (MED) methods. Salts contained in the water are typically disposed of in liquid form by returning the residual, high-salinity water byproduct of the desalination process to the sea. In general, about half of the feed water, which typically has an initial salt (NaCl) concentration of 3–4.5%, will be upgraded and the remainder will typically be returned to the ocean.

Traditionally, desalination has been coupled to gas turbine power plants because of the high quality waste heat that is available to drive the evaporation process. Many modern power plants, however, use steam cycle technology or a combined cycle design in which a Brayton (or gas turbine) cycle is the topping cycle and a Rankine (steam) cycle is the bottoming cycle. These other types of power plant designs generally produce less waste heat and are generally not attractive for powering desalination of seawater. Because both the type of power plant to which the traditional desalination technology is applied and the quality of the water source are generally constant, only a limited number of technologies (e.g., MSF and MED) have been applied to desalination via waste heat utilization.

A problem with the MSF and MED technologies is that, even though the energy source is essentially without cost because the power plant provides waste heat to be used in the process, the capital costs for power plant construction are high and may be of the same order of magnitude of the capital cost for the power plant itself. These high costs for the desalination process stem from the process equipment needed for handling low pressure water vapor and the number of evaporator/condenser heat exchangers that are required. Another problem with the existing technique of desalinating water at power plants adjacent large open bodies of water, such as oceans, is that many arid regions of the world are not near coastal areas and there may be no acceptable source of surface water for purification. Further, because the standard desalination process is based on use of waste heat from power plants such as gas turbine (Brayton Cycle) power plants, and this type of plant is less efficient than steam plants (Rankine Cycle) or combined cycle plants, the existing desalination technologies used for sea water may not be directly applicable to use in future power plant designs or those power plants that are located away from any readily available source of open surface water.

SUMMARY

In order to address the need for efficiently providing potable water and the drawbacks of the existing methods for desalination of water, a method and system for desalinating water from underground sources, such as aquifers is described below. The method includes acquiring water from an inland, underground source of water and desalinating this source of water both for use in human consumption, and industrial or agricultural purposes. Preferably, the method and system are available for use with combined cycle power plants as well as steam cycle and gas turbine power plants.

According to a first aspect of the invention, a method of generating a supply of potable water is disclosed, where the method includes drawing a supply of brackish water from an underground source of brackish water and reducing the salinity of the supply of brackish water using waste heat from a power plant to produce a supply of potable water. In different embodiments, the salinity may be reduced with non-distillation stages such as reverse osmosis units or electrodialysis units.

According to a second aspect of the invention, a system is disclosed having a raw water supply inlet in communication with an inland, underground supply of brackish water, and at least one source of waste heat from a power generator. At least one distillation stage is adapted to use the waste heat to desalinate the water. In some embodiments, one or more non-distillation desalination stages are adapted to desalinate the brackish water from the raw water supply inlet and produce potable water and a residual brine water. Also, at least one vapor compression stage may be configured to receive the residual brine water and a portion of the waste heat and adapted to produce potable water and a solid waste product.

Other features and advantages of the invention will become apparent to those of ordinary skill in the art upon review of the following drawings, detailed description and claims.

DETAILED DESCRIPTION OF THE PRESENTLY PREFERRED EMBODIMENTS

Figure 1:
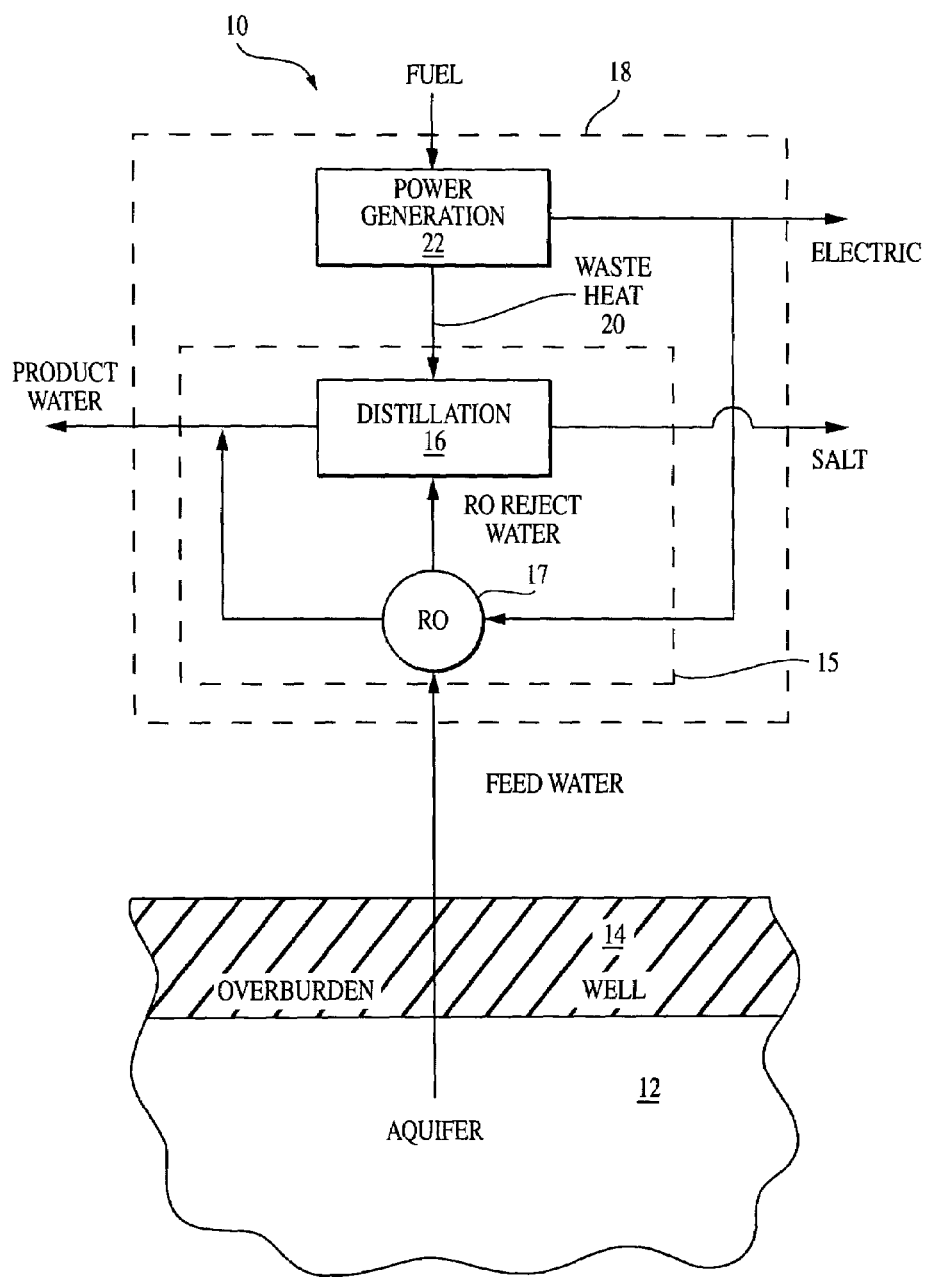
FIG. 1 shows a block diagram of a cogeneration plant for generating power and for desalinating brackish water retrieved from an inland, underground source according to a preferred embodiment.

FIG. 1 illustrates a block diagram of a preferred system 10 for cogenerating electrical energy and producing potable water from brackish water drawn from an inland underground water source. For purposes of this specification, brackish water is defined as water containing an amount of dissolved solids, such as salts, that prevents its use for human consumption. In one preferred embodiment, brackish water is water containing more than 1000 parts per million (ppm) of dissolved solids.

An inland underground source of brackish water 12, for example an aquifer, may be tapped via a well or other known manner of extracting water from an underground source. A supply pipe from a well 14 delivers the brackish water to a brackish water processing section 15 of the cogeneration plant 18 that is adapted to remove dissolved solids, such as salts, from the brackish water. If necessary, the brackish water may be filtered to remove any particulates prior to feeding into the brackish water processing section 15. As shown in FIG. 1, the brackish water processing section may consist of one or more reverse osmosis stages 17 and one or more distillation stages 16. Waste heat 20 discharged by the power generator section 22 of the cogeneration plant 18 is provided to the brackish water processing section 15. The power generation section 22 produces electrical power for general distribution and both the reverse osmosis stage and the distillation stage of the brackish water processing section 15 each generate potable water for general distribution to local populations and agricultural areas, and for potential use as coolant in the power generator section 22. While the source of brackish water is preferably an inland, underground source, surface pond water or other inland marsh water may be used in other embodiments.

Figure 2:
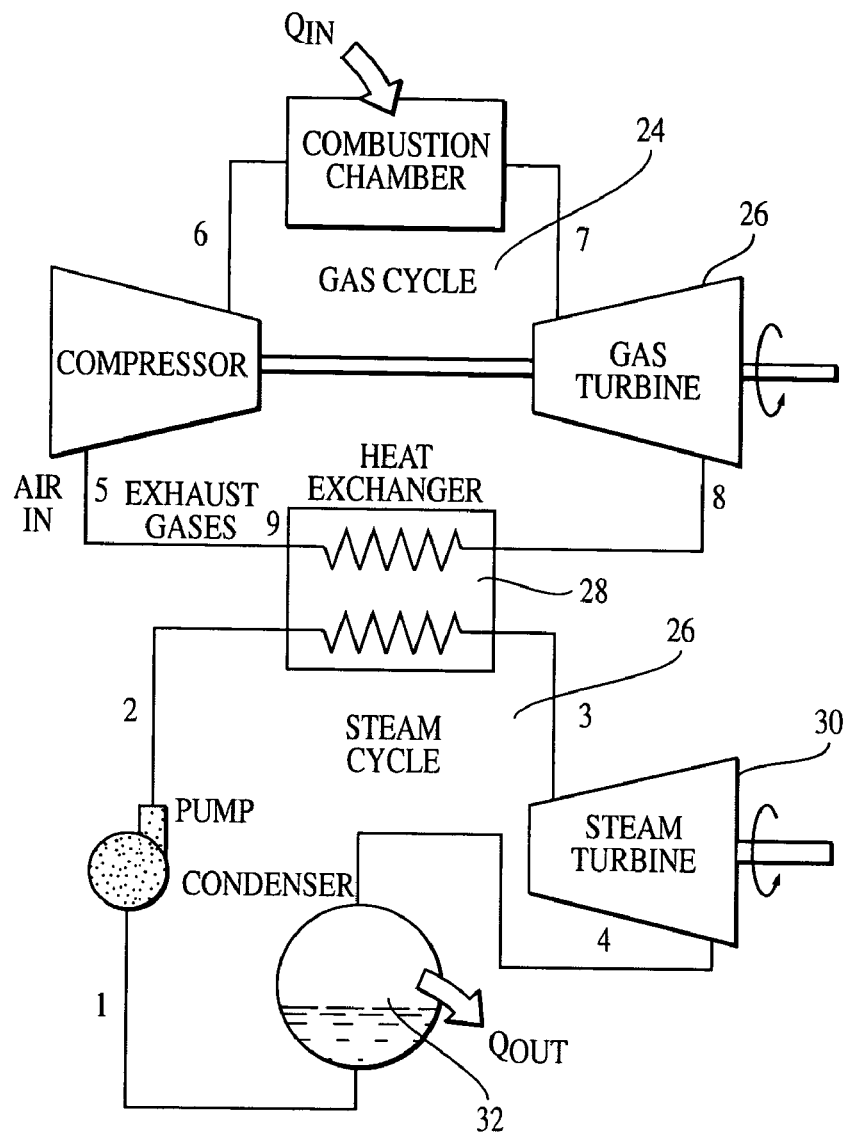
FIG. 2 illustrates a combined cycle power generator suitable for use in the cogeneration plant of FIG. 1.

Although any of a number of types of power generation schemes that produce some form of waste heat may be used in the power generator section of the cogeneration plant, one preferred power generator section is a combined cycle power generator as shown in FIG. 2 where a Brayton top cycle and a Rankine bottoming cycle are combined. In the embodiment of FIG. 2, a gas turbine cycle 24 is implemented for the Brayton cycle and a steam cycle 26 for the Rankine cycle. In the gas cycle 24, the gas turbine 27 exhausts hot combustion gases that are passed through a heat exchanger 28. The heat exchanger 28 couples the majority of the heat energy from the exhaust gas of the gas turbine cycle to the steam cycle 26, but some hot flue gases are discharged as waste heat. As explained in greater detail below, the waste heat from the gas turbine cycle is one source of energy used by the brackish water processing section 15 of the cogeneration plant 18.

The heat energy transferred to the steam cycle raises the working fluid (e.g. steam) of the steam cycle 26 to a superheated state. The superheated steam then expands through the steam turbine 30 to produce additional power. The exhaust from the steam turbine is sent to a condenser 32. The reject heat at the condenser provides a second source of energy for the desalination section of the cogeneration plant. This energy, however, generally will be low quality because the temperature in the condenser 32 will likely be just above the ambient temperature.

Figure 3:
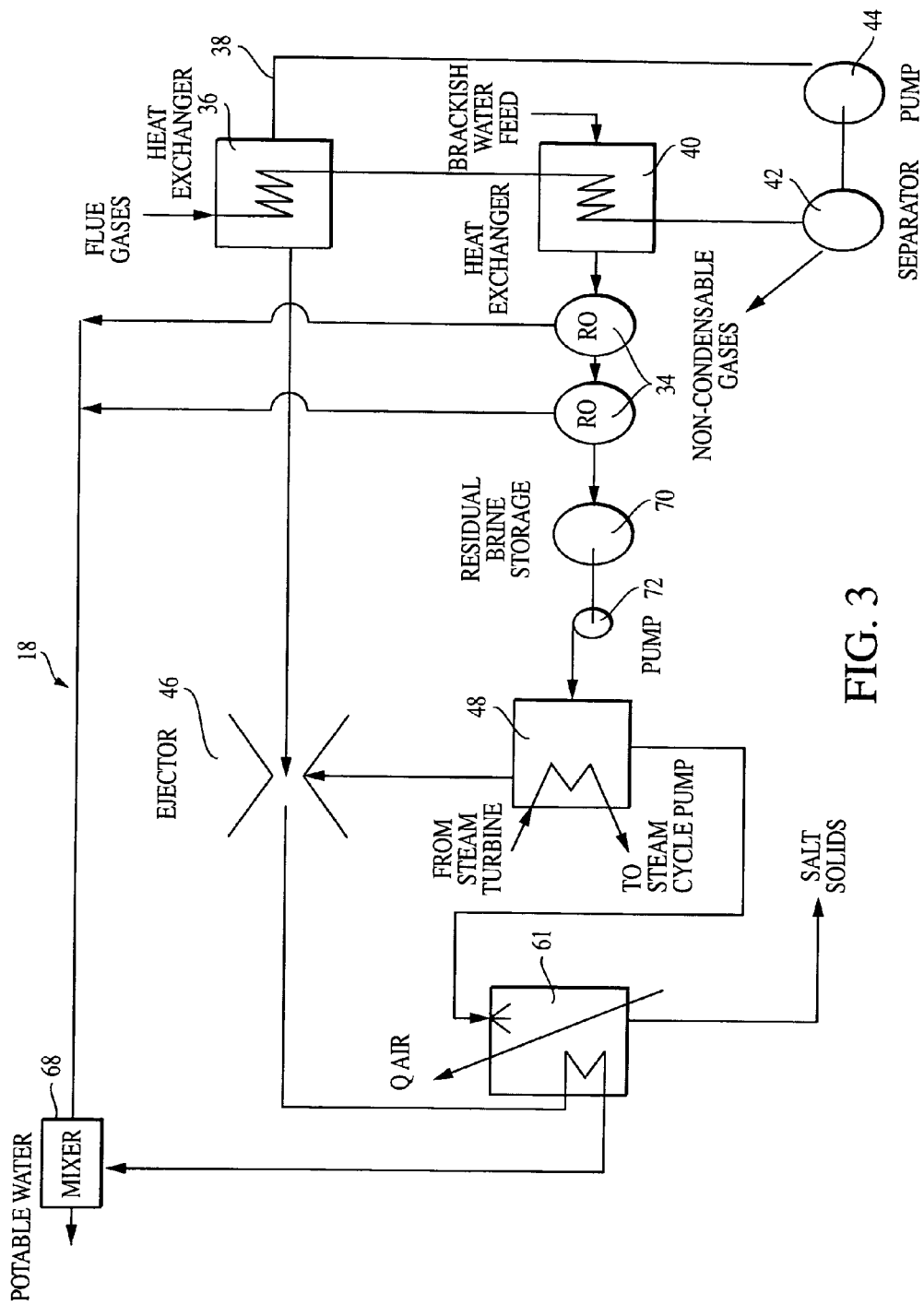
FIG. 3 illustrates a brackish water processing section suitable for use with the cogeneration plant of FIG. 1.

Referring to FIG. 3, one preferred type of brackish water processing section 15 for use in the cogeneration plant is shown. The brackish water processing section of FIG. 3 includes one or more stages of reverse osmosis units as the primary desalination stages. Other non-distillation units, such as electrodialysis units, are also contemplated. The final stages of the brackish water processing section use the waste heat from the steam cycle to remove substantially all of the dissolved solids from the highly saline byproduct of the initial reverse osmosis stages. Preferably, the dissolved solids are removed in solid form so that no waste liquid needs to be disposed of, and so that the maximum amount of potable water is recovered. These final stages of the brackish water processing section preferably take advantage of the principles of a vapor compression refrigeration cycle where the brine left over from the reverse osmosis stages acts as the working fluid for the refrigeration cycle and the heat from the condenser of the steam cycle acts as the evaporator for the vapor compression refrigeration cycle.

The operation of the embodiment of FIG. 3 may be understood by tracking the path of the exhaust flue gases expelled from the gas cycle and the path of the brackish water recovered from the inland, underground source of brackish water. The hot flue gases which have exited the gas turbine 27 give up energy in a heat exchanger 36 by heating a high pressure pure water stream 38 condensed from the hot flue gases further along the process path. The flue gases then pass into a condenser 40 where the raw brackish water absorbs sufficient energy to condense combustion water carried in the flue gases. This combustion water then passes through a separator 42 where the non-condensable gases, such as $N_2$, $O_2$ and $CO_2$, are exhausted. The liquid water condensed from the flue gases is then boosted in pressure by a pump 44 and passes through the heat exchanger 36 before it enters the ejector 46.

At the ejector 46, the stream of potable water partly flash vaporizes and passes through a venturi where pressure drops down, for example to around 0.1 atmosphere, and draws vapor from the Rankine bottoming cycle condenser 48 (i.e., the water evaporated using the energy from the condenser in the steam cycle). This combined purified water vapor stream is then condensed in a brine water spray tower, where the remaining brine water byproduct of the heat exchange in the condenser of the steam cycle is vaporized, thus absorbing the energy of condensation from the pure water stream. The brine water that does not vaporize will preferably become supersaturated so that solid salt will precipitate from the collection pan at the bottom of the tower to be removed by any suitable mechanical methods.

Turning to the processing that the raw brackish water feed undergoes, the brackish water from the inland, underground source first enters into the brackish water processing section via the flue gas condenser 40 to absorb condensation energy from the flue gas. The now heated brackish water is transported into the first of a series of preferably two or more reverse osmosis treatment units 34, each of which remove approximately 67% of feed as purified water in one embodiment. The reverse osmosis units 34 may be any of a number of standard designs selected to process the brackish water at a desired flow rate. Assuming, for example, that the feed salinity of the brackish water was approximately 3000 ppm, the first reverse osmosis stage would discharge potable water and a residual brine of approximately 10,000 ppm salinity, and the second reverse osmosis unit would receive the residual brine and output potable water and a residual brine of 30,000 ppm, approximately seawater salinity.

In one embodiment, the residual brine water from each reverse osmosis unit can be sent through a turboexpander (not shown) to recover some of pressurization energy. The brackish water is pressurized to overcome the differences in osmotic pressure across the membrane which separates purified water from residual brine water. The pressurization energy left over in the residual brine may be recovered.

Referring again to FIG. 3, two residual brine processing stages 48, 61 are implemented. One or more of these stages may be implemented in other embodiments. As discussed above, first stage is preferably a distillation unit where the working fluid from the Rankine bottoming cycle is condensed, giving up its latent heat to the evaporating water from the brine stream. A steam ejector 46 is used as the main motive force to reduce pressure in the first stage 48. A mechanical vapor compressor, which requires external power, may be used if necessary or if multiple effects are to be used. In the second residual brine processing stage 61, the evaporated water at an elevated pressure is condensed while preferably evaporating substantially all final remaining water from the salt concentrate that is at atmospheric pressure.

Figure 4:
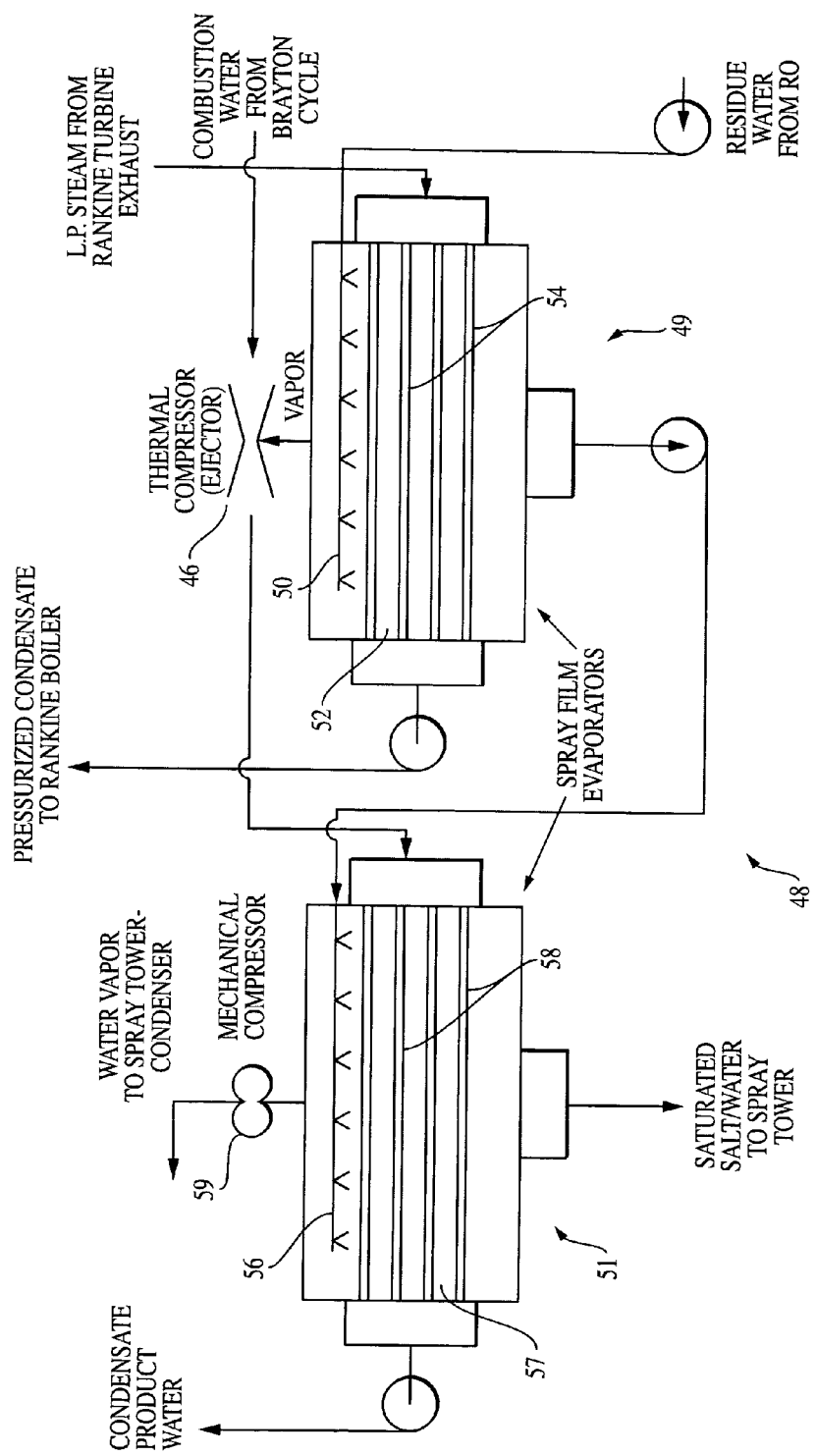
FIG. 4 illustrates a two effect distillation unit suitable for use with the brackish water processing section of FIG. 3.

Referring to FIG. 4, one embodiment of a suitable device for use as the first residual brine processing stage 48 is a two effect distillation unit. This two stage effect distillation unit 48 includes first and second spray film evaporator stages 49, 51. The first stage 49 has a spray assembly 50 arranged in a chamber 52 to spray the residual brine water from the reverse osmosis units onto tubes 54 containing the condensing fresh water from the steam cycle. The pressure in the chamber is preferably reduced by a thermal compressor (e.g. ejector 46) connected with the chamber 52 so that water from the brine evaporates by absorbing condensation energy. In this embodiment, the residual brine water from the reverse osmosis units will pass through the first stage of the two effect distillation unit 48, utilizing the ejector 46 for evacuation to produce potable water vapor to mix into the combustion water from the Brayton cycle via the ejector, and a more concentrated residual brine byproduct. As mentioned above, the thermal energy to drive the evaporation process will be provided by the condensing water from the steam cycle.

The second stage 51 may be a mechanical vapor compression stage that receives the concentrated residual brine from the first stage 49. The residual brine is passed through a spray assembly 56 positioned in a chamber 57 oriented to spray the residual brine water from the first stage onto tubes 58 containing the combustion water from the Brayton cycle. The pressure in the chamber of the second stage is preferably reduced by a mechanical compressor 59 connected with the chamber.

This evaporated water from the ejector 46 then passes through the condensing tubes 58 where, because of higher pressure on the discharge of the compressor 59, the temperature is elevated sufficiently to drive heat transfer across the tubes to the brine. If sufficient pressure reduction is available, boiling occurs at a temperature near ambient, so an auxiliary heat source is not needed. The condensate product from the second stage 51 is potable water and the residual brine from the second stage, now an even more saturated salt/water mix, is sent to the second residual brine processing stage 61.

Figure 5:
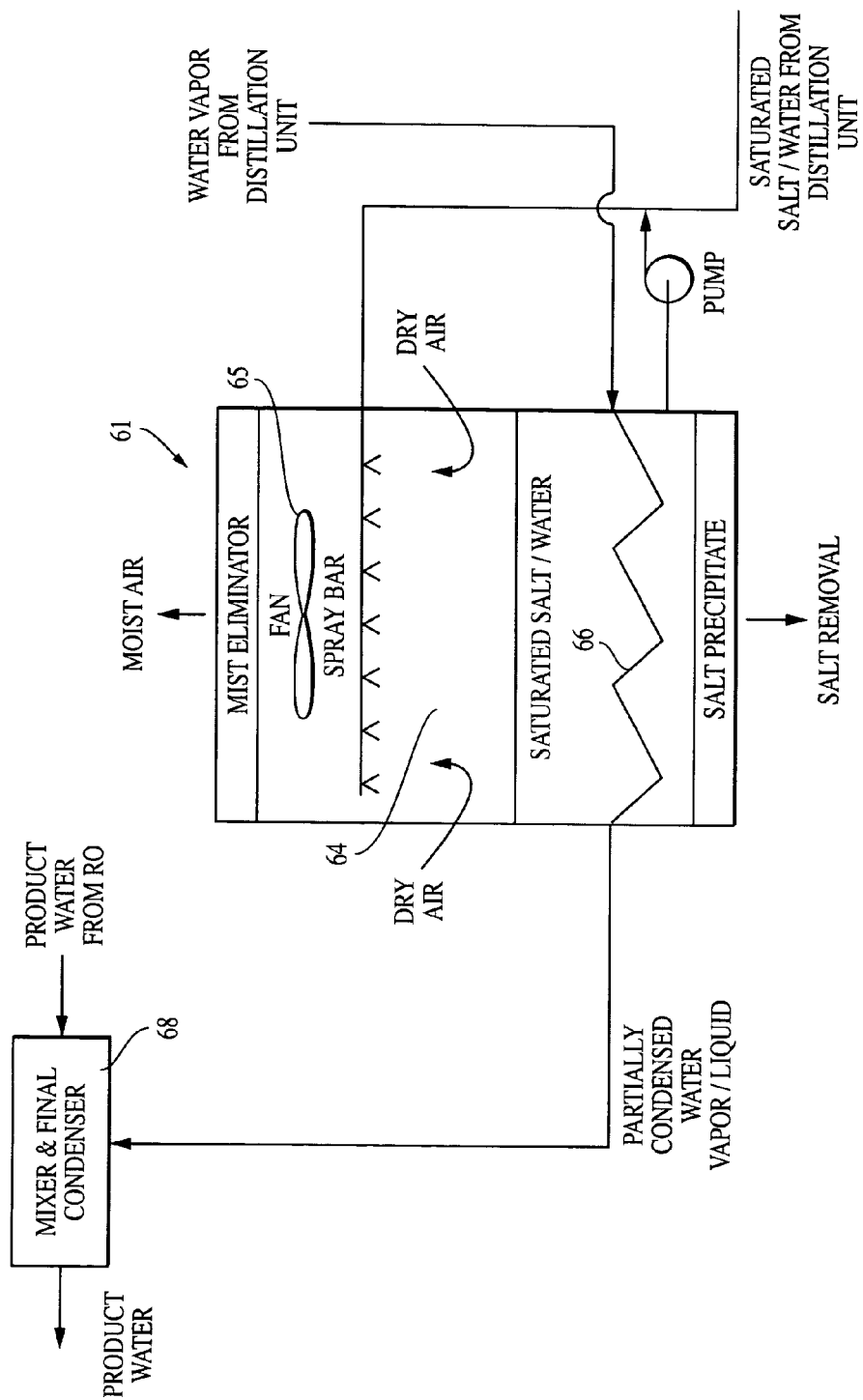
FIG. 5 illustrates a partial condenser unit suitable for use in the brackish water processing section of FIG. 3.

One preferred embodiment of a suitable second residual brine processing stage 61 is illustrated in FIG. 5. This stage receives the saturated salt and water mix from the second stage 51 of the two effect distillation unit 48 and sprays this solution from a spray bar 62 in a chamber 64. A fan 65 positioned in the chamber 64 circulates dry air provided to the chamber to evaporate the salts from the water. The chamber receives energy from the coil 66 containing water vapor drawn out of the chamber in the second stage 51 of the two effect distillation unit 48 by the mechanical compressor. In the chamber 64, salt precipitate is gathered as a saturated salt and water mixture meets with the dry air and evaporates. The solid salts that are precipitated out in the chamber 64 may be removed mechanically. The water vapor from the second stage 51 of the two effect distillation unit 48 continues through the coil 66, out of the chamber 64 and on into a mixer 68 where the partially condensed water vapor and liquid is fully condensed and mixed with the potable water generated by the reverse osmosis units.

The reverse osmosis units are preferably powered by electrical power from the power generation section. In one embodiment, the reverse osmosis units 34 of the brackish water processing section 15 operate on a continuous basis to provide potable water from the retrieved underground brackish water 12. In another embodiment, because the reverse osmosis units generally require significant electrical power, the reverse osmosis units may be selectively shut down to make additional saleable power available at the power generation section. For example, the reverse osmosis units may be set to automatically shut down during certain hours of the day when electrical power demand is highest and then automatically start up the desalination in off-peak times (e.g. at night). Alternatively, the reverse osmosis units may be actively controlled to sense the outside power demand on the cogeneration plant and shut down if the power demand reaches a certain threshold. In yet other embodiments, one or more other external parameters, such as outside ambient temperature, may be actively sensed and responded to in order to minimize desalination processes during desired periods.

If the reverse osmosis units will be selectively shut down, a storage tank 70 of the residual brine concentrate is maintained in order to provide a continuous feed to the thermal or mechanical vapor compression stages handling recovery of the water in the flue gases and evaporation of the dissolved salts to dryness. During times when the reverse osmosis units are not running, a pump 72 can feed leftover residual brine from the storage tank to maintain the operation of the condenser of the Rankine bottoming cycle and recovery of water from the flue gases. The residual brine storage tank 70 would need to have the capacity for a supply of residual brine sufficient to maintain the process for the maximum shut-off period contemplated.

The mixer 68 preferably blends remaining vapor in the steam from the second residual brine processing stage 61 and reverse osmosis units, and completes the condensation following the spray tower condenser. In this way, the salt will precipitate from the solution in the spray tower condenser. In one embodiment, a fresh water storage tank (not shown) may be maintained to absorb this final condensation energy to address any additional need for energy absorption and continuous product water supply (potable water).

From the foregoing, a method and system for generating potable water from a source of inland, underground brackish water has been described. An advantage of the method is that arid inland regions can efficiently co-generate both power and potable water implementing the disclosed method and system. In addition to converting as much of the brackish feed water as possible to product water, this method may be used to recover the water produced by combustion of a hydrocarbon fuel in the Brayton topping cycle. In general, if the mass flow rate of the topping cycle will be an order of magnitude higher than the bottoming cycle, and the amount of combustion water will be over twice the mass flow rate of the fuel, a substantial additional quantity of water may be recovered. The difficult issue of disposal of highly saline byproduct from traditional desalination, particularly where there is not an open body of salt water to return byproduct into, may be avoided by the technique of precipitating the salts to solid form described above. In other embodiments, the apparatus and method may be adapted to solely utilize distillation stages for desalinating brackish water, thereby avoiding all use of non-distillation techniques. In yet other embodiments, the cogeneration plant may selectively direct brackish water through either distillation stages or a combination of non-distillation and distillation stages based on feed water salinity.

An advantage of the method and system described above is that the desalination process may be accomplished with the generally lower quality waste heat from combination type power plants as well as with power plant types, such as pure gas cycle or pure steam cycle, that generate more concentrated, higher quality waste heat. This flexibility permits for both retrofitting existing power plants and use with the more efficient designs of proposed modern power plants where waste heat may be less available. Also, the method and apparatus described above help prevent the need for expensive dry condensers that both increase power plant construction cost and reduce the cycle efficiency.

It is therefore intended that the foregoing detailed description be regarded as illustrative rather than limiting, and that it be understood that it is the following claims, including all equivalents, that are intended to define the spirit and scope of this invention.

We claim:

1. A method of generating a supply of potable water, the method comprising:
   drawing a supply of brackish water from a source of brackish water; and
   reducing the salinity of the supply of brackish water using waste heat from a power generator and producing a supply of potable water, wherein reducing the salinity of the heated supply of brackish water comprises:
   passing a heated supply of brackish water through at least one reverse osmosis unit;
   providing electrical power to the at least one reverse osmosis unit from the power generator; and
   automatically shutting down the reverse osmosis units and ceasing reduction of the salinity of the supply of brackish water based on a determination of power generator load, whereby power from the power generator is more readily available for distribution during times of peak load.

2. The method of claim 1, wherein the determination of power generator load comprises monitoring a time of day and comparing the monitored time to a shut-off schedule.

3. The method of claim 1, wherein the determination of power generator load comprises monitoring an outside ambient temperature and comparing the outside ambient temperature to a temperature threshold.

4. The method of claim 1, wherein the determination of power generator load comprises monitoring electrical power load on the power generator and comparing the electrical power load to an electrical power load threshold.

* * * * *